(12) United States Patent
Cho et al.

(10) Patent No.: US 12,098,577 B2
(45) Date of Patent: Sep. 24, 2024

(54) DOOR LOCKING STRUCTURE

(71) Applicants:Hyundai Motor Company, Seoul (KR); Kia Motors Corporation, Seoul (KR)

(72) Inventors: Ki Hyun Cho, Hwaseong-si (KR); Eui Chan Cho, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 594 days.

(21) Appl. No.: 16/891,501

(22) Filed: Jun. 3, 2020

(65) Prior Publication Data

US 2021/0172212 A1    Jun. 10, 2021

(30) Foreign Application Priority Data

Dec. 10, 2019    (KR) ........................ 10-2019-0163264

(51) Int. Cl.
| | | |
|---|---|---|
| *E05B 81/56* | (2014.01) | |
| *B60J 5/04* | (2006.01) | |
| *E05B 79/20* | (2014.01) | |
| *E05B 81/14* | (2014.01) | |
| *E05B 81/16* | (2014.01) | |
| *E05B 81/30* | (2014.01) | |
| *E05B 81/34* | (2014.01) | |
| *E05B 81/76* | (2014.01) | |
| *E05B 83/36* | (2014.01) | |
| *E05B 85/12* | (2014.01) | |

(52) U.S. Cl.
CPC ............... *E05B 81/16* (2013.01); *B60J 5/047* (2013.01); *E05B 79/20* (2013.01); *E05B 81/14* (2013.01); *E05B 81/30* (2013.01); *E05B 81/34* (2013.01); *E05B 81/56* (2013.01); *E05B 81/76* (2013.01); *E05B 83/36* (2013.01); *E05B 85/12* (2013.01); *E05Y 2900/531* (2013.01)

(58) Field of Classification Search
CPC .......... E05B 83/20; E05B 83/16; E05B 83/36; E05B 83/38; E05B 85/10; E05B 85/12; E05B 81/76
See application file for complete search history.

(56) References Cited

U.S. PATENT DOCUMENTS

| | | | | |
|---|---|---|---|---|
| 1,160,496 | A * | 11/1915 | Casper | .................... E05B 45/06 340/542 |
| 4,157,844 | A * | 6/1979 | Sarosy | .................... E05B 83/16 292/216 |
| 5,035,449 | A * | 7/1991 | Shiratori | .................. E05B 83/16 292/DIG. 43 |
| 5,242,208 | A * | 9/1993 | Ohya | ......................... B60J 1/14 296/146.1 |

(Continued)

FOREIGN PATENT DOCUMENTS

| | | |
|---|---|---|
| CN | 104718095 A | 6/2015 |
| KR | 101273070 B1 | 6/2013 |

*Primary Examiner* — Alyson M Merlino
(74) *Attorney, Agent, or Firm* — Slater Matsil, LLP

(57) ABSTRACT

A door locking structure includes a door located at a side of a vehicle, a locking unit provided at the door, an input unit configured to apply unlocking input to the locking unit, and a controller configured to receive the input through the input unit and to unlock the locking unit. The controller is configured to integrally unlock the locking unit in response to the input through the input unit.

13 Claims, 5 Drawing Sheets

(56) References Cited

U.S. PATENT DOCUMENTS

| | | | | |
|---|---|---|---|---|
| 5,688,004 | A * | 11/1997 | Karge | E05B 83/38 |
| | | | | 292/201 |
| 6,123,386 | A * | 9/2000 | Montone | E05B 83/16 |
| | | | | 292/336.3 |
| 7,322,636 | B1 * | 1/2008 | Woodhouse | B60J 5/0477 |
| | | | | 296/147 |
| 8,235,428 | B2 * | 8/2012 | Hunt | E05B 77/36 |
| | | | | 292/216 |
| 8,336,929 | B2 * | 12/2012 | Halliwell | E05B 81/20 |
| | | | | 292/201 |
| 9,605,452 | B2 * | 3/2017 | Yoshino | E05B 85/107 |
| 10,220,686 | B2 * | 3/2019 | Baccouche | E05B 83/38 |
| 11,454,060 | B2 * | 9/2022 | Rampalli | E05F 15/63 |
| 11,454,062 | B2 * | 9/2022 | Cho | E05F 15/616 |
| 11,498,468 | B2 * | 11/2022 | Hsu | B60J 5/0473 |
| 2014/0025262 | A1 * | 1/2014 | Eggeling | B60J 5/103 |
| | | | | 701/49 |
| 2015/0275562 | A1 * | 10/2015 | Warburton | B60J 5/103 |
| | | | | 701/49 |
| 2016/0193903 | A1 * | 7/2016 | Warburton | E05F 5/12 |
| | | | | 296/51 |
| 2017/0130495 | A1 * | 5/2017 | Wheeler | E05B 85/045 |
| 2021/0291632 | A1 * | 9/2021 | Ding | B60J 5/0477 |

\* cited by examiner

DOOR LOCKING STRUCTURE

CROSS-REFERENCE TO RELATED APPLICATIONS

This application claims priority to Korean Patent Application No. 10-2019-0163264, filed on Dec. 10, 2019, which application is hereby incorporated herein by reference.

TECHNICAL FIELD

The present disclosure relates to a locking structure for doors.

BACKGROUND

In general, a door having a swinging structure which is rotated to be opened in an outward direction is mounted as a vehicle door. This door having the swinging structure, after a driver or a passenger unlocks the door through a handle installed on the door when the driver or the passenger gets into or out of the vehicle, allows the driver or the passenger to rotate the door in an outward direction so as to form a space between the door and a vehicle body and then to get into or out of the vehicle through the space.

Further, a door having a sliding structure which is slid in forward and backward directions to be opened and closed is applied to a vehicle, such as a van or a concept car.

The above door having the sliding structure, after a driver or a passenger unlocks the door through a handle installed on the door when the driver or the passenger gets into or out of the vehicle, allows the driver or the passenger to slide the door in the forward and backward directions so as to form a space in the side surface of a vehicle body and then to get into or out of the vehicle through the space.

Recently, together with development of autonomous vehicles, standards for drivers' seats for driving vehicles have been relaxed, and various methods for getting into and out of vehicles have been researched.

Therefore, doors which are bidirectionally opened about a roof of a vehicle so that a driver or a passenger may easily access the interior of the vehicle are required, and thus, an opening structure of two doors facing each other is required.

Further, as this two door opening structure is provided, it is essentially required to change locking structures located on the inner surfaces of the doors.

Korean Patent Application No. 10-2011-0097657 discloses subject matter that is related to subject matter discussed herein.

SUMMARY

The present disclosure relates to a locking structure for doors. Particular embodiments relate to a door locking structure which is configured to unlock a door of a vehicle including a multi-locking unit in response to input through an input unit located on the door and simultaneously to rotate and open the door by a driving force applied by a driver located at the upper end of the door.

Embodiments of the present invention have been made in an effort to solve problems associated with the prior art and provide a door locking structure which may perform double locking.

Another embodiment of the present invention provides a door locking structure which may simultaneously perform unlocking of a locking unit configured to perform multi-locking through one input unit and application of driving force of a driver.

One embodiment of the present invention provides a door locking structure including at least one door located at both sides of a vehicle, at least one locking unit provided at the at least one door, an input unit configured to apply unlocking input to the at least one locking unit, and a controller configured to receive the input through the input unit and to unlock the at least one locking unit, wherein the controller integrally unlocks the at least one locking unit in response to the input through the input unit.

In a preferred embodiment, the at least one door may include an upper door configured to be rotated to be opened upwards in a height direction about an upper end of a roof, and a lower door configured to be rotated to be opened downward in the height direction about a vehicle body.

In another preferred embodiment, the at least one locking unit may include at least one auxiliary locker located on the upper door, and a main locker located at one end of the upper door.

In still another preferred embodiment, if unlocking input for the upper door is applied through the input unit, the controller may first unlock the at least one auxiliary locker and then unlock the main locker.

Another embodiment of the present invention provides a door locking structure including at least one upper door located at both sides of a vehicle, at least one auxiliary locker located on the at least one upper door, and a main locker located on the at least one upper door, an input unit configured to apply unlocking input to the at least one auxiliary locker and the main locker, and a controller configured to receive the input through the input unit and to unlock the main locker, wherein the at least one auxiliary locker is unlocked through mechanical driving in response to the input through the input unit, and the controller integrally unlocks the main locker in response to the input through the input unit.

In a preferred embodiment, if unlocking input for the at least one upper door is applied through the input unit, the at least one auxiliary locker may first be unlocked and the main locker may then be unlocked.

In another preferred embodiment, the input unit may include a housing located on the at least one upper door, a handle configured such that at least a portion of the handle is located inside the housing so as to apply user input to the handle, a wiring configured to perform electrical connection so as to unlock the main locker in response to the input through the handle, and an auxiliary locking cable configured such that one end thereof is located at the handle and the auxiliary locking cable is coupled to the at least one auxiliary locker.

In still another preferred embodiment, the door locking structure may further include a driver configured to apply driving force so as to perform input through the handle, if wireless user input is applied to the controller.

In yet another preferred embodiment, the controller may operate the driver to unlock the at least one auxiliary locker, and apply an electrical signal to unlock the main locker.

In still yet another preferred embodiment, the door locking structure may further include a driver configured to perform input through the handle, and a wheel gear unit located on the handle at a position corresponding to the driver, and the handle may be inserted into or rotated inside the housing according to driving of the driver.

In a further preferred embodiment, the door locking structure may further include an elastic member provided at a position opposite to one end of the handle inside the housing so as to restore the inserted handle to an original position thereof.

In another further preferred embodiment, the auxiliary locking cable may be coupled to a pawl of a latch of the at least one auxiliary locker, and the auxiliary locking cable may apply tension to the pawl in response to the input through the handle.

In still another further preferred embodiment, the pawl, to which the tension is applied, may be configured to release locking between a catch interlocked with the pawl and a striker.

In yet another further preferred embodiment, a brush unit located on the handle may contact the wiring in response to the input through the handle, and thus be electrically connected to the wiring.

Other aspects and preferred embodiments of the invention are discussed herein.

The above and other features of the invention are discussed herein.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
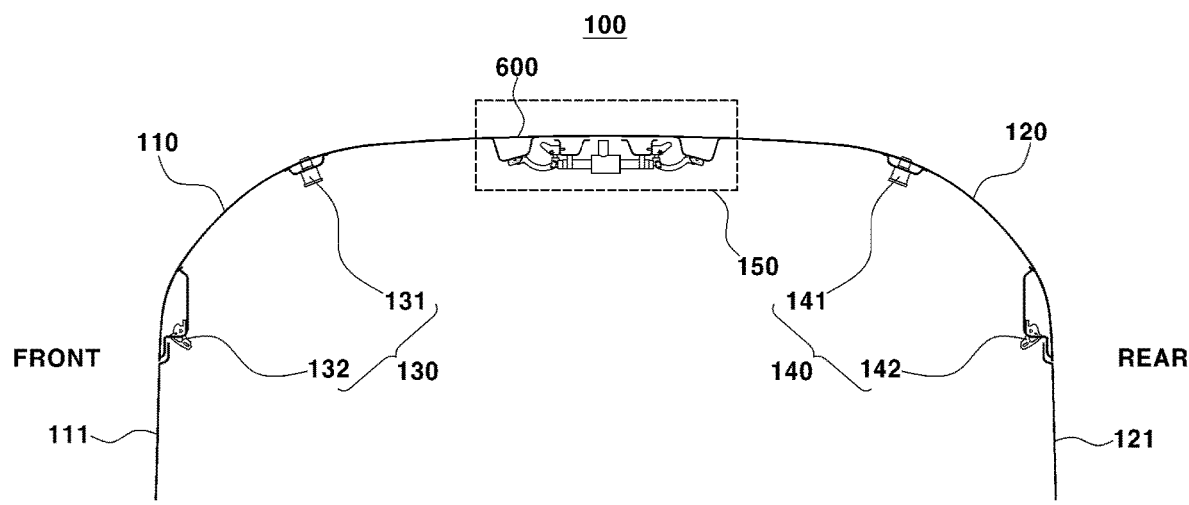
FIG. 1 is a longitudinal-sectional view of a vehicle having bidirectionally opened doors including a door locking structure according to one embodiment of the present invention.

It should be understood that the appended drawings are not necessarily to scale, presenting a somewhat simplified representation of various preferred features illustrative of the basic principles of the invention. The specific design features of embodiments of the present invention as disclosed herein, including, for example, specific dimensions, orientations, locations, and shapes will be determined in part by the particular intended application and use environment.

In the figures, reference numbers refer to the same or equivalent parts of embodiments of the present invention throughout the several figures of the drawing.

DETAILED DESCRIPTION OF ILLUSTRATIVE EMBODIMENTS

Hereinafter reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

In the following description of the embodiments, terms, such as " . . . part", " . . . unit", " . . . gear", etc., mean units for processing at least one function or operation, and they may be implemented by hardware or a combination of hardware.

Also, in the following description of the embodiments, terms, such as "first", "second", etc., are used only to distinguish one element from other elements, and do not limit the sequence of the elements.

In addition, in the following description of the embodiments, elements relating to connection between a first door and a second door having the same operating relations and a drive unit may be described while omitting the terms "first" and "second".

Further, in the following description of the embodiments, doors conceptually include a first door and a second door.

In addition, in the following description of the embodiments, locking units conceptually include a first locking unit and a second locking unit.

In the following description of the embodiments, the terms "first" and "second" have concepts relative to each other in consideration of symmetry of a door, and mean position relations which are symmetrical to each other in the width or length direction of a vehicle.

In addition, in the following description of the embodiments, doors may include various types of doors, such as an integral door, a divisible door, etc., and in the embodiments of the present invention, a vertically divisible door, i.e., a type of door which is divided into an upper door and a lower door, will be described.

Further, the first door and the second door are configured to be symmetrical to each other, and hereinafter a door locking structure will be described based on one upper door.

The present invention relates to a vehicle including a door locking structure, and particular embodiments relate to a bidirectional door opening module 100. In embodiments of the present invention, a first upper door 110 may be configured such that one end of the first upper door 110 close to a first position of the vehicle is rotated to be opened upwards in the height direction about the other end of the first upper door 110 adjacent to a roof 600, and a first lower door 111 may be configured to be located adjacent to the opened end of the first upper door 110.

A second upper door 120 may be configured such that one end of the second upper door 120 close to a second position of the vehicle is rotated to be opened in the height direction about the other end of the second upper door 120 adjacent to the roof 600, and a second lower door 121 may be configured to be located adjacent to the opened end of the second upper door 120.

The first upper door 110, the first lower door 111, the second upper door 120 and the second lower door 121 may include locking units 130 and 140, respectively. Further, the first upper door 110 and the second upper door 120 are configured such that, when the locking units 130 and 140 are unlocked in response to a driver's request, driving force of a drive unit 150 is selectively applied to the first upper door 110 and the second upper door 120, in which the locking units 130 and 140 are unlocked, so as to simultaneously or individually open the first upper door 110 and the second upper door 120.

More particularly, the drive unit 150 may be configured to apply driving force so as to open the first upper door 110 and the second upper door 120, and thus the drive unit 150 applies driving force to the first upper door 110 or the second upper door 120, in which the locking unit 130 or 140 is unlocked.

In one embodiment of the present invention, a controller 300 is configured to determine whether or not an unlocking request for the locking units 130 and 140 is applied according to application of input through an input unit 200, and more particularly, the controller 300, such as a smart junction box (SJB), may determine input through the input unit 200 depending on signal input or output, and output unlocking signals of the locking units 130 and 140.

FIG. 1 is a longitudinal-sectional view of an opening structure for the doors of the vehicle which are opened in first and second directions according to one embodiment of the present invention.

As shown in this figure, the drive unit 150 is located on the roof 600 of the vehicle, and one end of the first upper door 110 is rotated to be opened about the other end of the first upper door 110 adjacent to the drive unit 150. Further, one end of the second upper door 120 is rotated to be opened about the other end of the second upper door 120 adjacent to the rear end of the drive unit 150.

Further, the first lower door 111 which is rotated to be opened in the direction opposite to the rotating direction of the first upper door 110 may be further provided on the lower surface of the opened end of the first upper door 110, and the second lower door 121 which is rotated to be opened in the direction opposite to the rotating direction of the second upper door 120 may be further provided on the lower surface of the opened end of the second upper door 120.

The drive unit 150 is configured to be located between the first upper door 110 and the second upper door 120 on the roof 600 of the vehicle. More particularly, both ends of the drive unit 150 are coupled to a first hinge unit located on the first upper door 110 and a second hinge unit located on the second upper door 120, and the drive unit 150 transmits opening force applied by a driver to the first hinge unit and the second hinge unit, respectively.

The drive unit 150 may include the driver configured to apply opening force to the first upper door 110 and the second upper door 120, and a differential gear configured to transmit driving force applied by the driver to a spindle unit coupled to the first upper door 110 and the second upper door 120. The differential gear is configured to transmit the driving force applied by the driver to the spindle unit.

Therefore, the differential gear of the drive unit 150 transmits driving force to the first door 110 or the second door 120, which is unlocked, thereby opening the first door 110 or the second door 120, which is unlocked.

More particularly, when user unlocking input is applied to a corresponding one of input units 200 respectively located on the first upper door 110 and the second upper door 120, the drive unit 150 is driven so as to correspond to the first upper door 110 or the second upper door 120, and thus, the first door 110 or the second door 120, which is unlocked, is opened.

In addition, the spindle unit is configured to function as a damper of the hinge unit while the opened upper door 110 or 120 is being closed, thereby providing driving force for opening the doors 110 and 120 and preventing the doors 110 and 120 from rapidly falling while being closed.

The locking units 130 and 140 include a first locking unit 130 configured to unlock the first upper door 110 and a second locking unit 140 configured to unlock the second upper door 120, a first spindle is driven depending on unlocking input of the first locking unit 130, and a second spindle is driven depending on unlocking input of the second locking unit 140.

More particularly, the controller 300 operates the driver of the drive unit 150 in response to unlocking of the first locking unit 130 or the second locking unit 140, and thus performs control so as to open the first upper door 110 or the second upper door 120, which is unlocked.

The first locking unit 130 may include a first main locker 132 and first auxiliary lockers 131, the second locking unit 140 may include a second main locker 142 and second auxiliary lockers 141, and the spindle unit may be driven corresponding to unlocking input of the main locker 132 or 142 and the auxiliary lockers 131 or 141 of the first locking unit 130 or the second locking unit 140.

More particularly, in one embodiment of the present invention, unlocking input of the first locking unit 130 or the second locking unit 140 is applied through the input unit 200, and the drive unit 150 is operated corresponding to the applied unlocking input. The first auxiliary lockers 131 and the first main locker 132 which are located on the first upper door 110 are sequentially unlocked in response to unlocking input through a first input unit 200, and the first spindle is operated to rotate and open the first upper door 110.

Further, the second auxiliary lockers 141 and the second main locker 142 which are located on the second upper door 120 are sequentially unlocked in response to unlocking input through a second input unit 200, and the second spindle is operated to rotate and open the second upper door 120.

Figure 2:
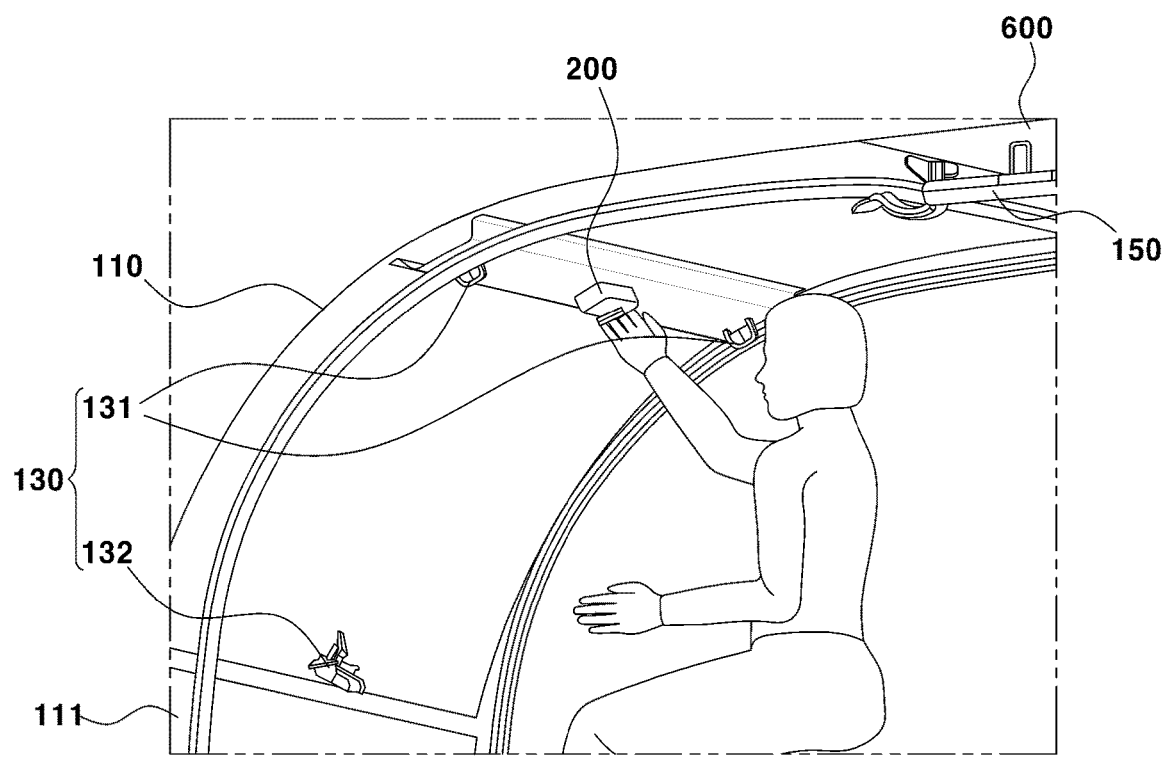
FIG. 2 is a perspective view illustrating the inner configuration of a door including the door locking structure according to one embodiment of the present invention.

FIG. 2 is a perspective view illustrating the first locking unit 130 and the first input unit 200 located on the first door according to one embodiment of the present invention.

As shown in this figure, the first upper door 110 includes the first locking unit 130 to perform locking of the first upper door 110. The first locking unit 130 includes the first auxiliary lockers 131 located at both sides of the first upper door 110, and the first main locker 132 located at one end of the first upper door 110 which is farthest away from the roof 600.

The first input unit 200 is located at the middle portion of the inner surface of the first upper door 110, and may be located at a position considering user convenience.

The first input unit 200 is configured to integrally unlock the first locking unit 130 located on the first upper door 110. More particularly, if a user request is applied through the first input unit 200, the controller 300 outputs an electrical signal so as to sequentially or integrally unlock the first locking unit 130.

In another embodiment of the present invention, according to application of a user request through the input unit 200, the first locking unit 130 may be unlocked by mechanical input through the input unit 200 simultaneously with output of an electrical signal from the controller 300.

More particularly, the first auxiliary lockers 131 are mechanically driven to be unlocked in response to input through the input unit 200, and the same input requests that the controller 300 output an electrical signal so as to unlock the first main locker 132.

Each of the first auxiliary lockers 131 may include a latch 400 configured to be coupled to a striker 510 located on a vehicle body 500, and the first main locker 132 may include a latch unit (not shown) configured to be fixed to a striker located on the vehicle body 500.

In one embodiment of the present invention, the latches 400 and the latch unit may be configured such that the controller 300 applies driving force to the latches 400 and the latch unit so as to perform unlocking corresponding to user input through the input unit 200.

Further, in another embodiment of the present invention, each of the latches 400 may be configured such that the latch 400 is coupled to the input unit 200 by an auxiliary locking cable 250 and thus the auxiliary lockers 131 are unlocked in response to mechanical input through the input unit 200, and the latch unit may be configured such that the controller 300 unlocks the main locker 132 through an electrical signal in response to the same input through the input unit 200.

The controller 300 may sequentially or integrally unlock the first auxiliary lockers 131 and the first main locker 132 in response to user input through the input unit 200, and apply driving force to the first upper door 110, which is unlocked, through the drive unit 150.

In summary, the first auxiliary lockers 131 are configured to be unlocked by mechanical or electrical driving force in response to user input through the input unit 200, and the first main locker 132 is configured to be unlocked by an electrical signal output from the controller 300. Further, one end of the first upper door 110, which is unlocked, close to the first position of the vehicle is rotated to be opened by driving the drive unit 150 in response to output from the controller 300.

Further, the second door includes substantially the same elements as those of the first door shown in FIG. 2, and thus has the same driving relations for locking and unlocking the second upper door 120.

Figure 3:
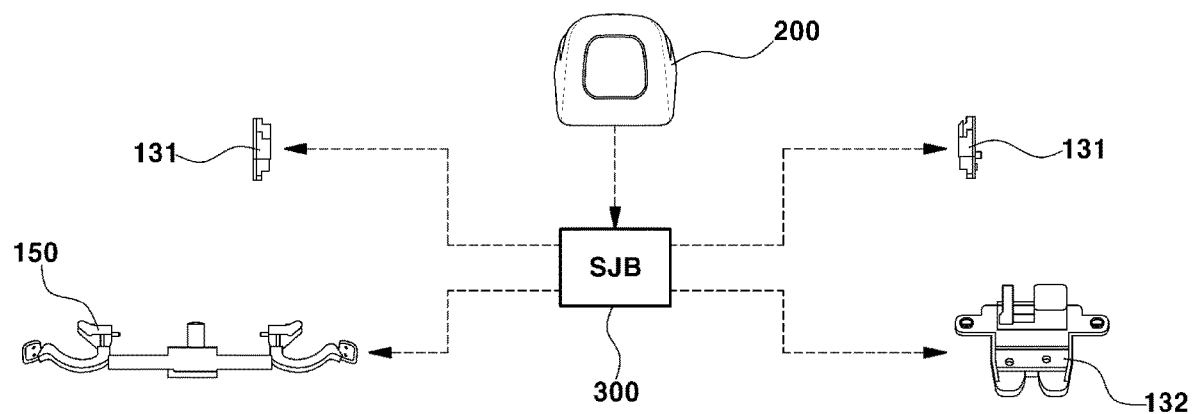
FIG. 3 is a schematic view illustrating the configuration of the door locking structure according to one embodiment of the present invention.

FIG. 3 is a schematic view illustrating coupling relations between the elements of the locking structure of the first door in which the first main locker 132 and the first auxiliary lockers 131 are unlocked through an electronic signal.

As shown in this figure, the controller 300 receives a user input signal through the input unit 200, and unlocks the first auxiliary lockers 131 and the first main locker 132 depending on the received input signal.

Further, the controller 300 outputs a signal so as to apply driving force of the drive unit 150 to the first upper door 110, when the first auxiliary lockers 131 and the first main locker 132 are unlocked.

The drive unit 150 includes the spindles configured to extend in the length direction of the vehicle, and the first and second spindles individually or simultaneously extend depending on the signal output from the controller 300 and thus open the first upper door 110 which is unlocked.

The input unit 200 may be located on the inner surface of the first upper door 110, and include a wireless input unit configured to apply an input signal through long distance communication with the input unit.

More particularly, an unlocking signal of the vehicle may be applied to the input unit 200 through wireless communication with a key of the vehicle or an application through a user mobile terminal, and an unlocking request may be applied to the input unit 200 through manual input using a handle 220 located on the inner surface of the vehicle.

Figure 4:
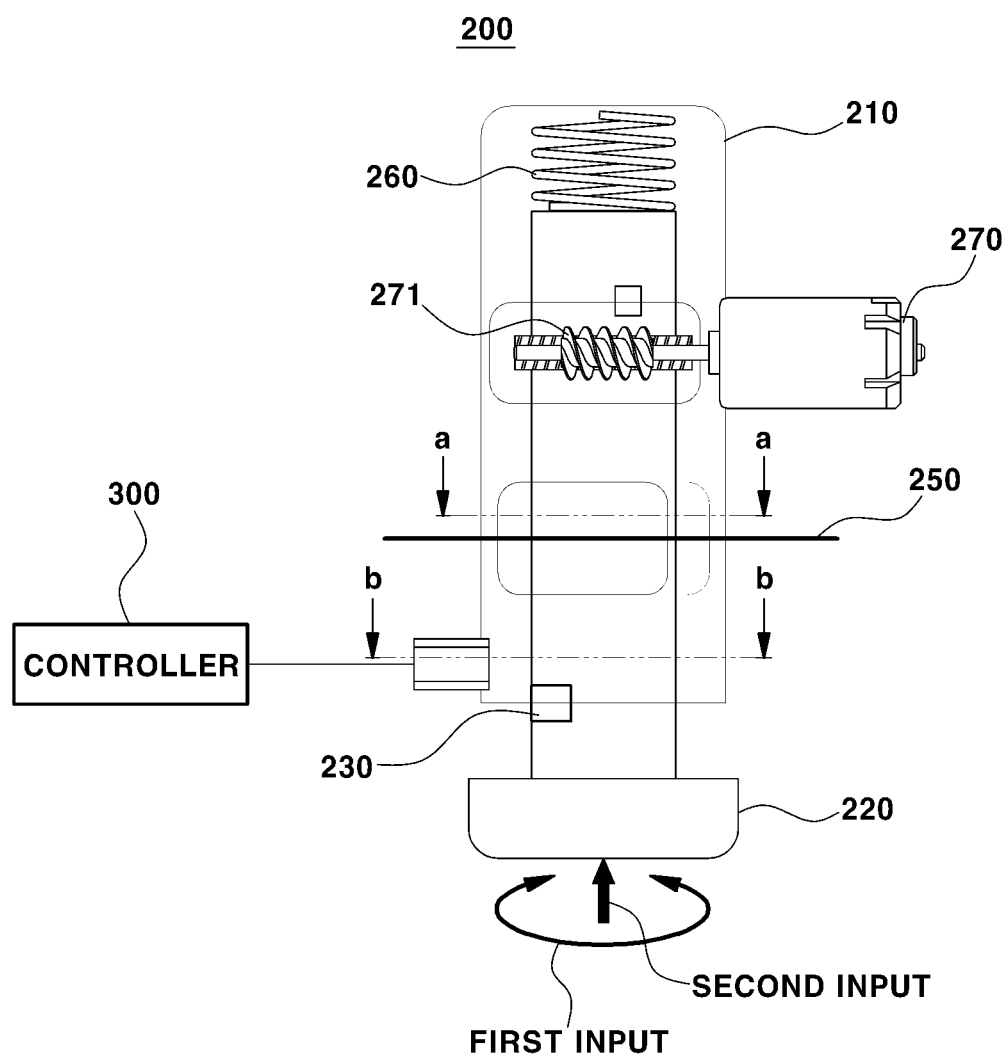
FIG. 4 is a schematic view illustrating the configuration of an input unit of a door locking structure according to another embodiment of the present invention.

FIG. 4 is a schematic view illustrating elements of an input unit 200 which may unlock the first auxiliary lockers 131 through manual input, according to another embodiment of the present invention.

If input through the input unit 200 is applied, the first auxiliary lockers 131 and the first main locker 132 are sequentially or integrally unlocked, and the input unit 200 according to this embodiment of the present invention is configured to unlock the first auxiliary lockers 131 through mechanical driving and to unlock the first main locker 132 through output of an electrical signal.

The input unit 200 may include a housing 210 which is indented into the first upper door 110, and the handle 220 which is inserted into the housing 210 so as to receive an unlocking request from a user.

The housing 210 according to embodiments of the present invention has a cylindrical shape and at least a portion of the handle 220 is located inside the housing 210. Further, the handle 220 may be configured such that a remaining portion of the handle 220 inserted into the housing 210 is additionally inserted into the housing 210 in response to user input in the length direction of the housing 210.

As yet another input type according to embodiments of the present invention, the handle 220 is configured such that a portion of the handle 220 inserted into the housing 210 is integrally rotated in response to rotary input through the handle 220 and thus applies mechanical driving force to the first auxiliary lockers 131.

The handle 220 located inside the housing 210 includes the auxiliary locking cable 250 which is coupled to the first auxiliary lockers 131. Further, the handle 220 includes a brush unit 230 which is electrically connected to a wiring 240 located inside the housing 210 so as to cause the controller 300 to output an electrical signal for unlocking the first main locker 132.

The auxiliary locking cable 250 is configured to move integrally with the handle 220 inside the housing 210 in response to lengthwise input or rotary input through the handle 220, and thus applies tension to the latches 400 coupled to the ends of the auxiliary locking cable 250.

The wiring 240 may be configured to have a designated gap with the brush unit 230 in the height direction of the housing 210 in response to push input, and if the handle 220 is additionally inserted into the housing 210, the brush unit 230 and the wiring 240 may be electrically connected, thus outputting an unlocking signal for the first main locker 132.

On the other hand, the brush unit 230 may be configured to be located at a height corresponding to the height of the wiring 240 in response to rotary input through the handle 220 and to be spaced apart from the wiring 240 by a designated angle based on the central axis of the housing 210, and the brush unit 230 and the wiring 240 may be electrically connected depending on a rotation angle of the handle 220.

More preferably, the brush unit 230 may be located at each or both of positions corresponding to push input and rotary input through the handle 220, and thus, generate electrical output for unlocking the first main locker 132 depending on a type of input according to user convenience.

The input unit 200 may include a drive unit 270 provided at one side of the housing 210, and if a user applies unlocking input from the outside of the vehicle, the drive unit 270 applies driving force so as to additionally insert the handle 220 into the housing 210 or to rotate the handle 220 inside the housing 210.

In one embodiment of the present invention, the drive unit 270 is configured to be coupled to a wheel gear unit 272 located on the handle 220, and a worm gear 271, to which the driving force of the drive unit 270 is applied, and the wheel gear unit 272 are interlocked with each other. Therefore, the driving force from the worm gear 271 is applied to the wheel gear unit 272 and thus the wheel gear unit 272 is rotated integrally with the handle 220.

In another embodiment of the present invention, the handle 220 may be inserted into the housing 210 by rotation of the worm gear 271 so that the brush unit 230 contacts the wiring 240 and simultaneously a designated tension is applied to the auxiliary locking cable 250.

In summary, the drive unit 270 located on one side surface of the housing 210 is configured such that the handle 220 is inserted into or rotated inside the housing 210 depending on coupling relations between the drive unit 270 and the wheel gear unit 272 located on the handle 220, and applies tension to the auxiliary locking cable 250 and allows the brush unit 230 to contact the wiring 240 so as to unlock the first main locker 132 and the first auxiliary lockers 131.

Thereby, if the door of the vehicle is unlocked from the outside of the vehicle, the first auxiliary lockers 131 are unlocked through mechanical driving force and simultaneously or sequentially the first main locker 132 is unlocked through the controller 300.

The handle 220 of the input unit 200 is configured to be inserted into or rotated inside the housing 210 so as to unlock the locking unit, and in order to restore the handle 220 to an original position thereof after insertion into the housing 210, the input unit 200 further includes an elastic member 260 provided at the inner end of the housing 210.

The elastic member 260 may be configured to be compressed in response to push input of the handle 220 so as to apply tension to the handle 220, and be configured to restore the handle 220 to the initial position of the handle 220 using torque caused by rotation of the handle 220.

Figure 5:
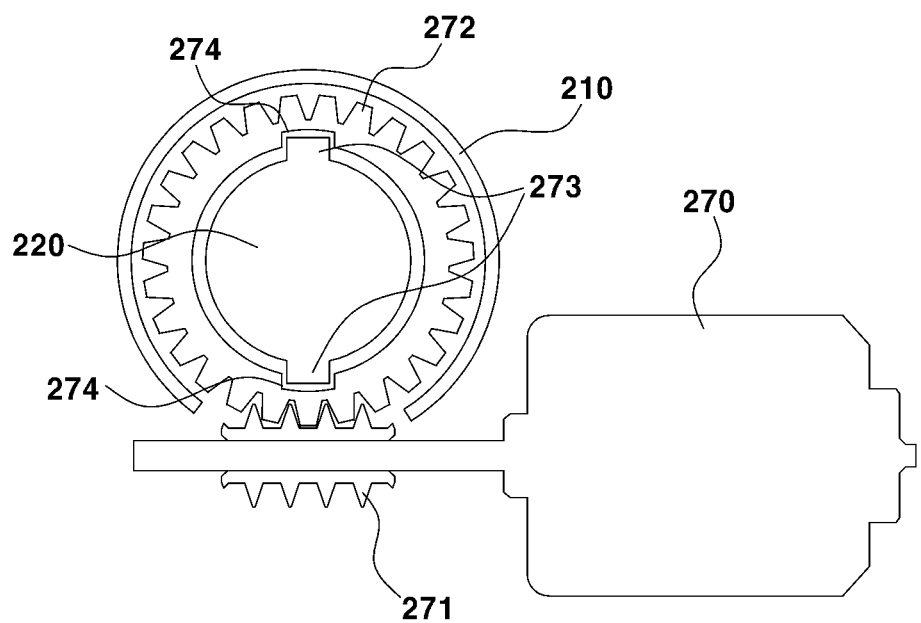
FIG. 5 is a cross-sectional view illustrating coupling relations between a driver and a handle according to one embodiment of the present invention.

FIG. 5 illustrates connection relations between the worm gear 271 of the drive unit 270 and the wheel gear unit 272 according to one embodiment of the present invention.

The drive unit 270 is located outside the housing 210, and is coupled to the wheel gear unit 272 configured to surround the handle 220. More particularly, the worm gear 271 located at one end of the drive unit 270 is configured to selectively contact the wheel gear unit 272.

Therefore, if user unlocking input is applied from the inside of the vehicle, the drive unit 270 may be converted to a freewheel mode so as to prevent generation of failure due to coupling between the drive unit 270 and the wheel gear unit 272, and thus, a state in which the handle 220 and the wheel gear unit 272 formed along the outside of the handle 220 are independently drivable may be maintained.

That is, if a user applies unlocking input for the first upper door 110 to the input unit 200 from the outside of the vehicle, the wheel gear unit 272 may be fixed to the handle 220, and the wheel gear unit 272 and the handle 220 may be simultaneously driven by the drive unit 270.

On the other hand, if the user applies unlocking input for the first upper door 110 to the input unit 200 from the inside of the vehicle, coupling between the wheel gear unit 272 and the handle 220 may be released, and the handle 220 alone may be independently driven.

In one embodiment of the present invention, the wheel gear unit 272 and the handle 220 may be coupled so as to be rotated integrally by inserting one or more protrusions 273 formed at the outer surface of the handle 220 into recesses 274 formed in the wheel gear unit 272, and when the protrusions 273 are located in regions other than the recesses 274, the handle 220 may be driven independently of the wheel gear unit 272.

Therefore, if an unlocking request for the first upper door 110 is input through the wireless input unit 200, the wheel gear unit 272 and the drive unit 270 are coupled to each other so as to induce physical movement of the handle 220, and if the user applies physical input to the input unit 200 from the inside of the vehicle, the handle 220 may be driven independently of the wheel gear unit 272, thereby being capable of preventing movement of the handle 220 from being restricted by the drive unit 270.

Figure 6:
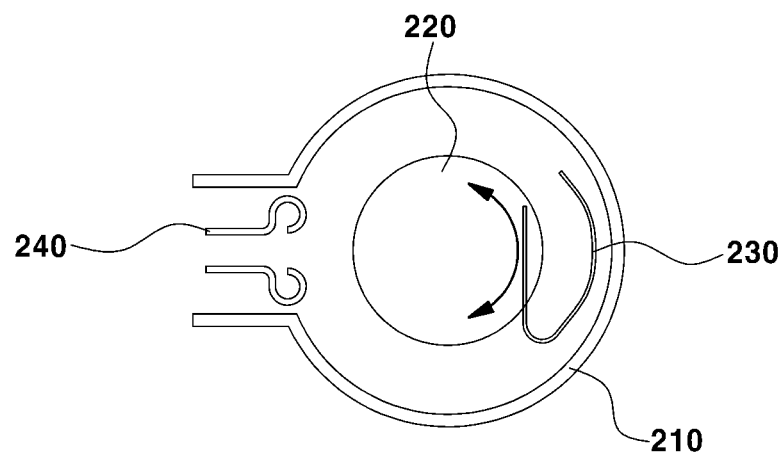
FIG. 6 is a cross-sectional view of an input unit of a door locking structure according to yet another embodiment of the present invention, taken along line b-b of FIG. 4.

FIG. 6 illustrates coupling relations between the elements for electrical connection between the brush unit 230 located on the handle 220 and the wiring 240 if the handle 220 is rotated in response to rotary input, according to another embodiment of the present invention.

FIG. 6 is a cross-sectional view taken along line b-b of FIG. 4, illustrating coupling relations between the wiring 240 and the brush unit 230.

The wiring 240 is provided at one side surface of the housing 210 so as to be electrically connected to the controller 300 outside the housing 210. The wiring 240 is configured so as to maintain an open state, and when the wiring 240 contacts the brush unit 230 located on one side surface of the handle 220, the brush unit 230 is electrically connected to the wiring 240.

When the brush unit 230 is electrically connected to the wiring 240, an electrical signal is applied to the controller 300, and the controller 300 unlocks the first main locker 132 based on the signal applied through the wiring 240.

The brush unit 230 is located at a portion of the side surface of the handle 220 so as to form a designated angle with the wiring 240, and contacts the wiring 240 in response to rotary input through the handle 220.

More particularly, only when rotary input is applied though the handle 220 so as to couple the brush unit 230 to both open ends of the wiring 240, an electrical signal is applied to the controller 300 through the wiring 240.

Figure 7:
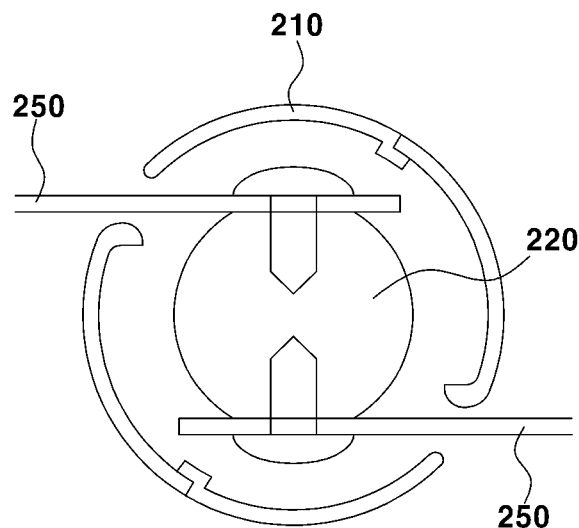
FIG. 7 is a cross-sectional view of an input unit of a door locking structure according to yet another embodiment of the present invention, taken along line a-a of FIG. 4.

FIG. 7 is a cross-sectional view of elements of the handle 220 to which auxiliary locking cables 250 are coupled, according to yet another embodiment of the present invention.

FIG. 7 is a cross-sectional view taken along line a-a of FIG. 4, illustrating the auxiliary locking cables 250, each of which has one end connected to each of the first auxiliary lockers 131 located at both sides of the first upper door 110, and the other end connected to the handle 220.

Here, one end of each of the auxiliary locking cables 250 is fixed to the handle 220, and the other end of each of the auxiliary locking cables 250 is coupled to the latch 400 of each of the first auxiliary lockers 131. More particularly, the other end of the auxiliary locking cable 250 is coupled to a pawl 410 of the latch 400 so as to apply tension to the pawl 410 through the auxiliary locking cable 250.

If rotary input is applied to the handle 220, the auxiliary locking cables 250 fixed to the handle 220 by fixing pins move along the handle 220 in the rotating direction of the handle 220. Therefore, tension is applied to the auxiliary locking cables 250 in the direction toward the input unit 200.

Thus, the tension of the auxiliary locking cables 250 is applied to the pawls 410 of the first auxiliary lockers 131, and locking of catches 420 of the latches 400 with the strikers 510 located on the vehicle body 500 is released.

Further, in yet another embodiment of the present invention, if the handle 220 is inserted into the housing 210 in the height direction of the housing 210 or is pulled in the length direction of the housing 210, the auxiliary locking cables 250 fixed to the fixing pins are moved integrally with the handle 220, and thus, a designated tension is applied to the first auxiliary lockers 131.

In summary, the auxiliary locking cables 250 are configured to apply mechanical driving force to the first auxiliary lockers 131 in response to various input types, and may thus unlock the first auxiliary lockers 131.

Figure 8:
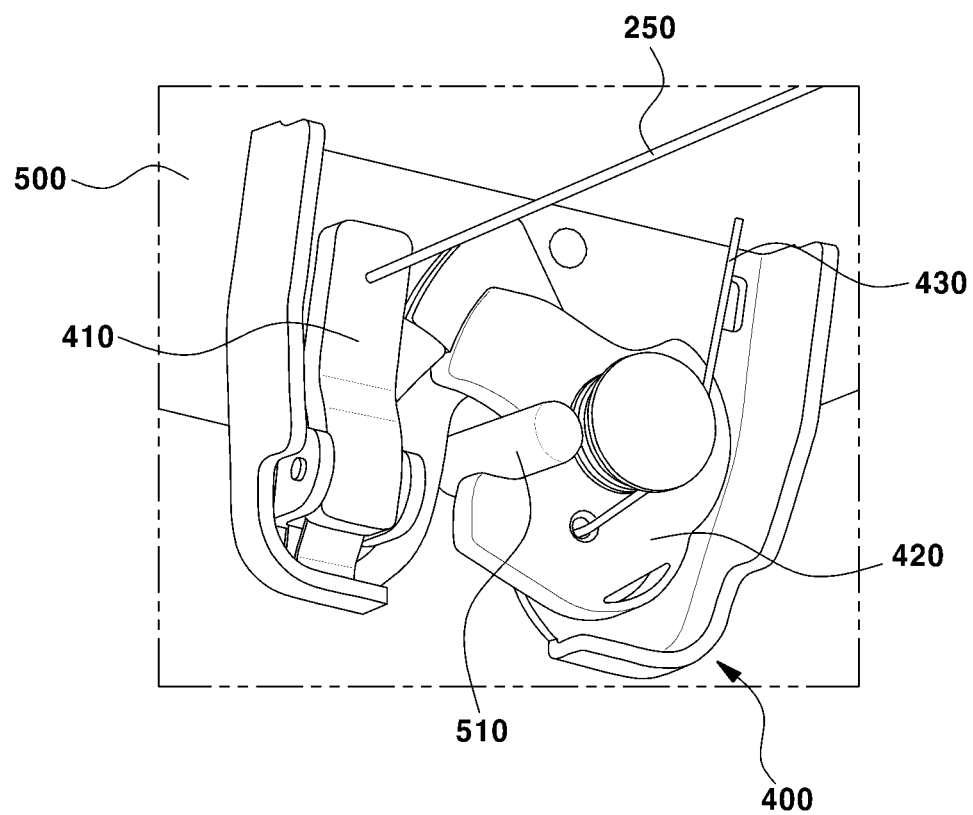
FIG. 8 is a perspective view illustrating the configuration of a latch of the door locking structure according to embodiments of the present invention.

FIG. 8 is a perspective view of the latch 400 located on the first auxiliary locker 131, and the latch 400 includes the pawl 410 coupled to one end of the first auxiliary locker 131, and the catch 420 located adjacent to the pawl 410 so as to be fixed to the striker 510.

A protrusion located at one end of the pawl 410 is configured to face one end of the catch 420 so as to maintain a fixed state between the catch 420 and the striker 510.

The catch 420 includes a return spring 430, to which a designated force is applied in a path direction in which the striker 510 is inserted into the catch 420, and if the catch 420 is fixed by the pawl 410 and then the pawl 410 is separated from the catch 420 by tension of the auxiliary locking cable 250, the catch 420 is rotated in a direction to release locking of the catch 420 with the striker 510 located on the vehicle body 500.

The pawl 410 is configured such that one end of the pawl 410 is rotated about a stationary shaft located at one end of the pawl 410 by the auxiliary locking cable 250, and an elastic spring is located at the stationary shaft so as to restore the pawl 410 to an original position thereof when the tension applied to the pawl 410 by the auxiliary locking cable 250 is released.

As such, an embodiment of the present invention provides the door locking structure which is configured such that, if an unlocking request (input) is applied through the input unit 200 located on the first upper door 110, electrical connection is applied to the first main locker 132 and mechanical driving force or electrical connection is applied to the first auxiliary lockers 131 so as to unlock the first main locker 132 and the first auxiliary lockers 131.

As is apparent from the above description, embodiments of the present invention may provide the following effects through the above-described configuration and connection and usage relations.

A door locking structure according to embodiments of the present invention may simultaneously unlock a main locker and auxiliary lockers in response to one input by a user, thereby improving user convenience.

Further, the door locking structure according to embodiments of the present invention may include an input unit configured to simultaneously perform mechanical driving input and electrical driving input, thereby improving user convenience.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents. That is, while the invention has been explained in relation to the embodiments thereof, it is to be understood that various modifications thereof will become apparent to those skilled in the art upon reading the specification. These embodiments have been described to explain the best mode to implement the technical scope of the invention, and various modifications required for the specific application and purpose of the present invention are possible.

Although, in the above description, a first door which may be located at a front region and a second door which may be located at a rear region have been described as bidirectional doors, the first door and the second door may include all doors which are located at symmetrical positions, i.e., one door located on the side surface of a vehicle and another door located on the side surface at a position opposite the first door, and the positions of the first door and the second door are not limited. Therefore, the above detailed description of embodiments of the present invention is not intended to limit the invention. Further, it must be interpreted that the accompanying claims include other modes.

What is claimed is:

1. A door locking structure in combination with at least one door, comprising:
    an auxiliary locker located on the at least one door;
    a main locker located on the at least one door;
    an input unit configured to apply an unlocking input to the auxiliary locker and the main locker; and
    a controller configured to:
        receive the unlocking input through the input unit, and unlock the main locker in response to the unlocking input,
    wherein the auxiliary locker is configured to be unlocked through mechanical drive force in response to the unlocking input, and
    wherein the input unit comprises:
        a housing located on the at least one door,
        a handle, wherein at least a portion of the handle is located inside the housing so that the unlocking input is applicable through the handle,
        a wiring configured to provide an electrical connection to the controller so as to cause the main locker to be electrically unlocked in response to the unlocking input applied through the handle, and
        an auxiliary locking cable configured to provide the mechanical drive force to the auxiliary locker so as to cause the auxiliary locker to be unlocked in response to the unlocking input applied through the handle, and so that the main locker and the auxiliary locker are unlocked simultaneously.

2. The door locking structure in combination with the at least one door of claim 1, further comprising a drive unit arranged at one side of the housing, wherein the drive unit is configured to apply a driving force to insert or rotate the handle inside the housing.

3. The door locking structure in combination with the at least one door of claim 2, further comprising:
    a worm gear located on the drive unit so as to be opposite the handle; and
    a wheel gear unit located on the handle at a position corresponding to the worm gear,
    wherein the handle is configured to be inserted into or rotated inside the housing according to driving force of the drive unit.

4. The door locking structure in combination with the at least one door of claim 3, further comprising an elastic member provided at a position opposite one end of the handle inside the housing so as to restore the inserted handle to an original position.

5. The door locking structure in combination with the at least one door of claim 1,
    wherein the auxiliary locking cable is coupled to a pawl of a latch of the auxiliary locker, and
    wherein the auxiliary locking cable is configured to apply the mechanical drive force as tension to the pawl in response to the unlocking input through the handle.

6. The door locking structure in combination with the at least one door of claim 5, wherein the pawl, to which tension is applied, is configured to release locking between a catch interlocked with the pawl and a striker.

7. The door locking structure in combination with the at least one door of claim 1, further comprising a brush unit located on the handle, wherein the brush unit is configured to contact the wiring in response to the unlocking input applied to the handle and is electrically connected to the wiring.

8. A vehicle comprising:
a vehicle body;
a roof;
an upper door configured to be rotated to be opened upward in a height direction about an upper end of the roof;
a lower door configured to be rotated to be opened downward in the height direction about the vehicle body;
a locking unit comprising:
  an auxiliary locker located on the upper door; and
  a main locker located at one end of the upper door; and
an input unit configured to apply an unlocking input to the locking unit, the input unit comprising:
  a housing located on the upper door;
  a handle, wherein at least a portion of the handle is located inside the housing so that the unlocking input is applicable through the handle;
  a drive unit arranged at one side of the housing, the driver drive unit configured to apply a driving force to insert or rotate the handle inside the housing;
  a wiring configured to provide an electrical connection to a controller so as to cause the main locker to be electrically unlocked in response to the unlocking input applied through the handle; and
  an auxiliary locking cable configured to provide a mechanical drive force to the auxiliary locker so as to cause the auxiliary locker to unlocked in response to the unlocking input applied through the handle, and so that the main locker and the auxiliary locker are unlocked simultaneously,
wherein the controller is configured to receive the unlocking input through the input unit and to electrically unlock the main locker.

9. The vehicle of claim 8, further comprising:
a worm gear located on the drive unit so as to be opposite the handle; and
a wheel gear unit located on the handle at a position corresponding to the worm gear, wherein the handle is configured to be inserted into or rotated inside the housing according to the driving force of the drive unit.

10. The vehicle of claim 9, further comprising an elastic member provided at a position opposite one end of the handle inside the housing so as to restore the inserted handle to an original position.

11. The vehicle of claim 8,
wherein the auxiliary locking cable is coupled to a pawl of a latch of the auxiliary locker, and
wherein the auxiliary locking cable is configured to apply the mechanical drive force as tension to the pawl in response to the unlocking input through the handle.

12. The vehicle of claim 11, wherein the pawl, to which the tension is applied, is configured to release locking between a catch interlocked with the pawl and a striker.

13. The vehicle of claim 8, further comprising a brush unit located on the handle, wherein the brush unit is configured to contact the wiring in response to the unlocking input applied to the handle and is electrically connected to the wiring.

* * * * *